Feb. 4, 1941.  A. D. MACLACHLAN  2,230,723
HOSE
Filed Jan. 21, 1938
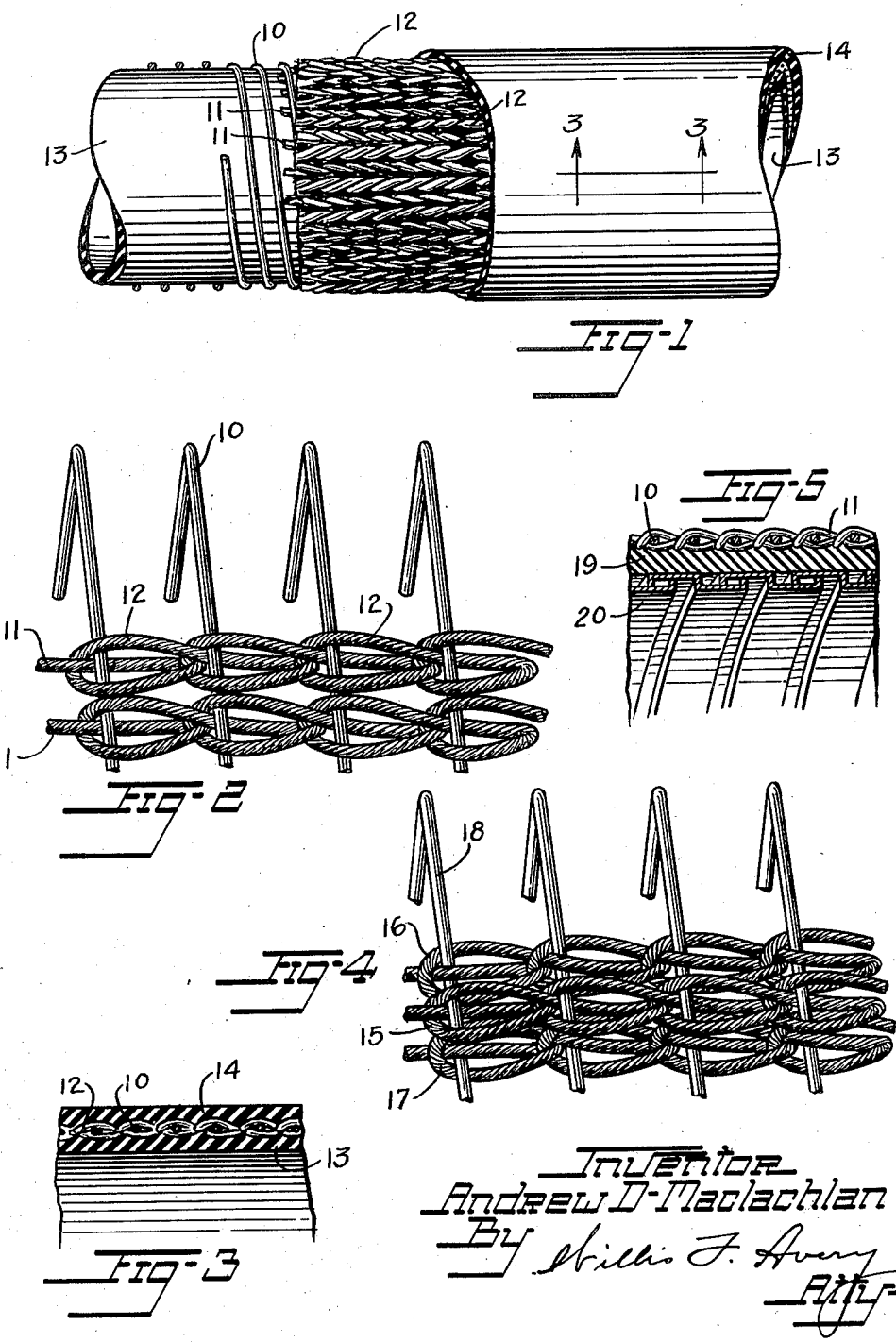

Patented Feb. 4, 1941

2,230,723

UNITED STATES PATENT OFFICE 2,230,723

HOSE

Andrew D. Maclachlan, Akron, Ohio, assignor to The B. F. Goodrich Company, New York, N. Y., a corporation of New York Application January 21, 1938, Serial No. 186,124

2 Claims. (Cl. 66—193)

This invention relates to hose, and is especially useful where high resistance to bursting and great flexibility are desired.

The principal objects of the invention are to provide high resistance to bursting, great flexibility, longitudinal strength and impermeability.

These and other objects will appear from the following description and the accompanying drawing.

Of the drawing:

Fig. 1 is a side elevation of a section of hose embodying the invention in its preferred form, the various elements thereof being broken away in steps to show the construction, parts being broken away.

Fig. 2 is a detail view showing portions of successive convolutions of wire with longitudinal reinforcing members hitched about the successive convolutions, parts being broken away.

Fig. 3 is a fragmentary sectional view of the hose taken on line 3—3 of Fig. 1.

Fig. 4 is a view similar to Fig. 2 showing a modification in the manner of arranging the longitudinal reinforcing members.

Fig. 5 is a longitudinal sectional view of a finished hose showing the reinforcing structure employed as a cover.

Referring to the drawing, and first to Fig. 1, the numeral 10 designates a rigid reinforcing element, preferably of metallic wire and preferably round in cross section, formed to provide a helix of spaced convolutions throughout the length of the hose. A plurality of longitudinally disposed warp elements or reinforcing members 11 in the form of cords, preferably of cotton, are each secured to successive convolutions of the wire helix or weft element by a series of chain loops 12 formed in the cords about the wires to provide longitudinal wales. Preferably the longitudinal reinforcing warp elements are so closely spaced as substantially to fill the circumference of each convolution of wire with chain loops, one loop of each longitudinal cord being looped about each convolution of wire. The arrangement is such that where soft yarns are used as the longitudinal warps, the natural elasticity or stretchability of the yarns assisted by the looped arrangement provides great flexibility to the hose, and where harder cords are used as the warp elements, the natural tendency of the links to stand as open loops together with the freedom of movement provided by such a linkage also provides great flexibility to the hose.

In manufacturing the reinforcement, the yarns or cords may be worked about the wires, one at a time by using a crochet needle or similar instrument, or the yarn or cords may be knitted about the helix simultaneously, or may be hitched about the wire progressively as the wire is helically applied to the hose, or in any other suitable manner.

An impervious lining 13 of rubber or other suitable material may be incorporated within the reinforcing structure, preferably after the reinforcement has been constructed, and a cover 14 of rubber or other suitable material may be applied over the outside of the reinforcing structure. The assembled hose may then be subjected to vulcanization in any desired manner, preferably by enclosing the hose in a jacket or wrapping and applying steam or hot water under pressure to the inside of the hose to force the rubber composition into the interstices of the reinforcing structure and provide a good bond between the lining and the cover.

Where it is desired to arrange the longitudinal reinforcing warp elements in closer relation, these may be arranged to embrace the wire convolutions as shown in Fig. 4 where the arrangement of the chain loops or hitches about the convolutions is reversed in circumferentially successive reinforcing elements to provide wales on alternate sides of the helix. In this arrangement, the loops adjacent the wires may overlap each other and provide a more dense structure. Referring to this drawing the loop 15 extends over the wire 18 while the loops 16 and 17 extend under the wire.

If desired, the reinforcing structure herein described may be employed as the outer cover of the hose as shown in Fig. 5 where the wire convolutions 10 and longitudinal warp elements 11 are on the outer surface of a layer 19 of rubber or other flexible impervious material and a lining 20 of flexible metal tubing provides an inner protective lining. This type of hose is especially useful in dispensing motor fuel or as a suction hose.

Where the reinforcement is used as an outer covering it is desirable to wind the helix of wire about the previously formed lining coincident with the application of the longitudinal reinforcing elements thereto, the longitudinal warp elements being looped successively about the wire as it is laid and all of the elements being drawn closely about the lining as the wales are formed, although the covering may be preformed, if desired.

Various modifications may be made without departing from the scope of the invention as it is defined by the following claims.

I claim:

1. A tubular hose reinforcing structure comprising a weft element of stiff reinforcing material disposed circumferentially of the structure in spaced apart helical convolutions, and a plurality of warp elements of flexible material extending longitudinally of the structure, all of the longitudinally extending warp elements being disposed in series of chain loops with portions of the loops lying over and portions lying under the circumferentially disposed element, the longitudinally extending elements being arranged in succession circumferentially of the structure to provide wales on alternate sides of the helix.

2. A tubular hose reinforcing structure comprising a weft element of stiff reinforcing material disposed circumferentially of the structure and a plurality of warp elements of flexible material extending longitudinally of the structure, all of the longitudinally extending warp elements being disposed in series of chain loops with portions thereof lying over and portions lying under the circumferentially disposed element, and said warp elements being arranged in succession circumferentially of the structure to provide wales alternately on the inside and outside of the structure.

ANDREW D. MACLACHLAN.